United States Patent Office.

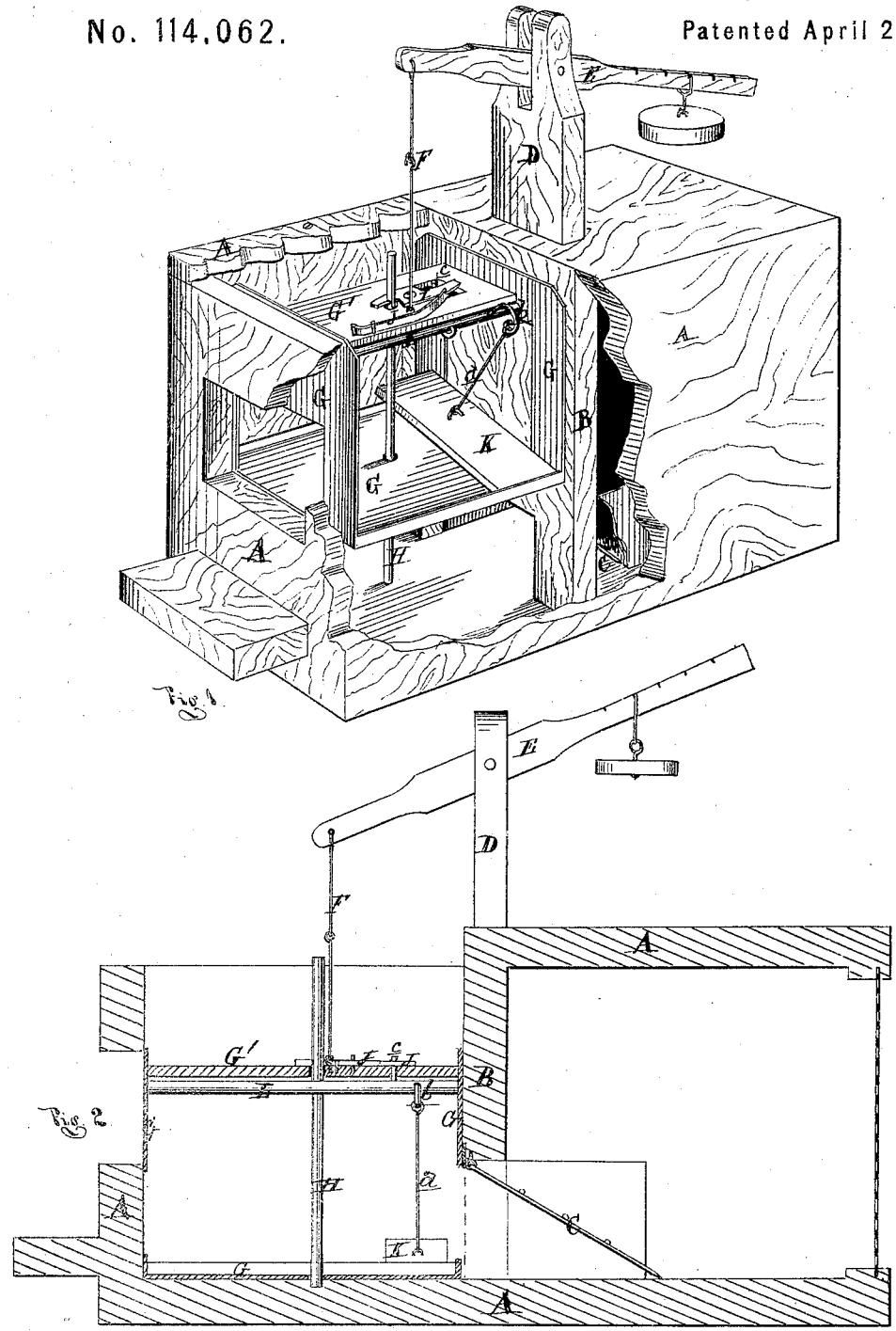

JOHN N. STOW AND ROBERT LOOP, OF CAMDEN, OHIO.

Letters Patent No. 114,062, dated April 25, 1871.

IMPROVEMENT IN ANIMAL-TRAPS.

The Schedule referred to in these Letters Patent and making part of the same.

*To whom it may concern:*

Be it known that we, JOHN N. STOW and ROBERT LOOP, of Camden, in the county of Preble and State of Ohio, have invented a new and useful Improvement in Animal-Traps; and we do declare that the following is a true and accurate description thereof, reference being had to the accompanying drawing and to the letters of reference marked thereon and being a part of this specification, in which—

Figure 1 is a perspective view of our trap with portions of the outer walls broken away to show the interior construction; and Figure 2 is a vertical longitudinal section of the same.

Like letters indicate like parts in each figure.

The nature of this invention relates to an improvement in the construction of self-setting animal-traps; and It consists in the peculiar arrangement within a box of a vertically-moving balanced chamber so arranged that when the animal enters it the chamber falls, disclosing another chamber, which he enters expecting to escape, when the chamber rises again and sits for the next customers.

Also, in the automatically-operating locking mechanism, operating as more fully hereinafter set forth.

In the drawing—

A represents an oblong rectangular box, divided into compartments by a transverse partition, B, in the lower part of which is an opening or passage provided with a grated trap, C, opening into the rear compartment.

D is a central standard, rising from the box, in which is hung an adjustably-weighted scale-beam, E, from which is suspended, by a wire, F, a metallic chamber, G, in the front compartment. This chamber has a floor and end walls, each having an opening in it sufficiently large to permit the animal to pass through; longitudinally across the top a wooden plate, G', extends from the front to the rear end walls.

H is a central rod, rising from the bottom of the box, through the compartment which moves freely on it.

In the upper part of this rod is a notch, with which engages a latch, I, being forced therein by a spring, J, on the top of the plate G'.

In the lower rear end of the chamber is hinged a pedal or platform, K, connected by a wire, a, with an arm, b, of a rock-shaft, L, journaled in the upper part of the end walls, and provided with a bell-crank, c, which engages with the latch to draw it out of the notch in the rod when a weight is imposed on the platform.

The rear end of the box may be glazed or grated to light it up.

When the chamber is elevated, as shown in fig. 1, its front opening is coincident with a corresponding opening in the front wall of the box through which the animal enters.

The bait is placed on the pedal K.

When the animal enters the compartment or chamber he mounts the platform K to secure the bait; his weight thereon disengaging the latch, the chamber descends to the bottom of the compartment, when he sees light in the rear compartment and seeks to escape by entering it, lifting up the trap C, which drops and prevents his exit; as soon as he leaves the sliding chamber the weighted scale-beam draws it up until the latch engages with the notch on the rod H again, when it is set for the next comer.

What we claim as our invention, and desire to secure by Letters Patent, is—

1. The notched rod H, latch I, spring J, pedal K, rock-shaft L, wire a, arm b, and bell-crank c, in connection with the sliding chamber G, as and for the purpose set forth.

2. In combination with the above-named parts the box A divided by the partition B, the trap-grate C, the standard D, scale-beam E, and wire F, when arranged and operating in the manner and for the purpose set forth.

JOHN N. STOW.
ROBERT LOOP.

Witnesses:
WM. L. HUFFMAN,
C. M. ROHRER.